United States Patent
Zhu (10) Patent No.: US 11,288,528 B2
(45) Date of Patent: Mar. 29, 2022

(54) DIFFERENTIATION-BASED TRAFFIC LIGHT DETECTION

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 0 days.

(21) Appl. No.: 16/872,574

(22) Filed: May 12, 2020

(65) Prior Publication Data
US 2021/0357668 A1 Nov. 18, 2021

(51) Int. Cl.
| | | |
|---|---|---|
| G06K 9/00 | (2006.01) | |
| G06K 9/20 | (2006.01) | |
| G08G 1/16 | (2006.01) | |
| G06T 7/215 | (2017.01) | |
| G08G 1/095 | (2006.01) | |

(52) U.S. Cl.
CPC ....... G06K 9/00825 (2013.01); G06K 9/2054 (2013.01); G06T 7/215 (2017.01); G08G 1/095 (2013.01); G08G 1/165 (2013.01); G06K 2009/2045 (2013.01); G06T 2207/30252 (2013.01)

(58) Field of Classification Search
CPC ......................... G06K 9/6215; G06K 9/00798
See application file for complete search history.

(56) References Cited

U.S. PATENT DOCUMENTS

| | | | |
|---|---|---|---|
| 2013/0253754 A1* | 9/2013 | Ferguson | G06K 9/00791 701/28 |
| 2017/0262709 A1* | 9/2017 | Wellington | G06K 9/6201 |
| 2018/0211530 A1* | 7/2018 | Sarkar | G05D 1/0231 |

* cited by examiner

*Primary Examiner* — Clifford Hilaire
(74) *Attorney, Agent, or Firm* — Womble Bond Dickinson (US) LLP (57) ABSTRACT

A method, apparatus, and system for determining a state of an upcoming traffic light is disclosed. At an autonomous driving vehicle (ADV), an upcoming traffic light ahead in a direction of travel is detected. A relative position of the ADV to the traffic light is determined based on a three-dimensional (3D) position of the traffic light and a position of the ADV. A first image whose content includes the traffic light is captured. A second image of the traffic light is obtained, which comprises cropping the first image and preserving only a first sub-region of the first image that corresponds to the traffic light. One or more third images of the traffic light are retrieved from a precompiled image library based on the relative position of the ADV to the traffic light. A state of the traffic light is determined based on the one or more third images.

20 Claims, 8 Drawing Sheets

DIFFERENTIATION-BASED TRAFFIC LIGHT DETECTION

TECHNICAL FIELD

Embodiments of the present disclosure relate generally to operating autonomous driving vehicles. More particularly, embodiments of the disclosure relate to identifying a state of a traffic light at an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Machine vision-based automatic identification of the state of an upcoming traffic light is an important perception task in the operation of an autonomous driving vehicle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a state of an upcoming traffic light is determined based on images in a precompiled image library. At an autonomous driving vehicle (ADV), an upcoming traffic light ahead in a direction of travel is detected. A relative position of the ADV to the traffic light is determined based on a three-dimensional (3D) position of the traffic light and a position of the ADV. In particular, the 3D position of the traffic light may be determined based on a prepopulated map. A first image whose content includes the traffic light is captured. A second image of the traffic light is obtained, which includes cropping the first image and preserving only a first sub-region of the first image that corresponds to the traffic light. The first sub-region of the first image that corresponds to the traffic light is determined based on the relative position of the ADV to the traffic light. One or more third images of the traffic light are retrieved from a precompiled image library based on the relative position of the ADV to the traffic light. A state of the traffic light is determined based on the one or more third images. A trajectory for the ADV is planned based at least in part on the determined state of the traffic light. Control signals are generated to drive the ADV based on the planned trajectory.

In one embodiment, the state of the traffic light includes one of: a green state, a yellow state, or a red state. In one embodiment, retrieving, at the ADV, the one or more third images of the traffic light include retrieving, at the ADV, a set of third images of the traffic light having been captured from a same relative position to the traffic light, each third image in the set of third images showing the traffic light in a respective state. To determine the state of the traffic light based on the one or more third images, one third image in the set of third images that is most similar to the second image is determined, and the state of the traffic light is determined based on the one third image in the set of third images that is most similar to the second image. In particular, the state of the traffic light shown in the one third image in the set of third images that is most similar to the second image is determined as the state of the traffic light.

In one embodiment, the precompiled image library includes a plurality of sets of third images of the traffic light captured from a plurality of different relative positions to the traffic light, each set of third images corresponding to one respective relative position to the traffic light, and the set of third images retrieved at the ADV are the set whose corresponding relative position to the traffic light is closest to the relative position of the ADV to the traffic light.

In one embodiment, the precompiled image library includes a plurality of sets of third images of the traffic light captured from a plurality of different relative positions to the traffic light and in a plurality of different lighting conditions, each set of third images corresponding to one respective relative position to the traffic light and to one respective lighting condition, and the set of third images retrieved at the ADV are the set whose corresponding relative position to the traffic light is closest to the relative position of the ADV to the traffic light and whose corresponding lighting condition matches a present lighting condition. In one embodiment, the different lighting conditions include a daylight lighting condition or a nighttime lighting condition.

In one embodiment, to determine one third image in the set of third images that is most similar to the second image, a similarity score is calculated against the second image for each third image in the set of third images.

In a different embodiment, retrieving, at the ADV, the one or more third images of the traffic light include retrieving, at the ADV, a special third image of the traffic light having been captured from a particular relative position to the traffic light and showing the traffic light in a special state in which all component lights of the traffic light are off. To determine the state of the traffic light based on the one or more third images, among sub-regions in the special third image corresponding respectively to the component lights of the traffic light, a second sub-region of the special third image that is most dissimilar to a corresponding sub-region of the second image is determined, and the state of the traffic light is determined based on the second sub-region of the special third image. In particular, the traffic light is determined to be in a state in which the component light corresponding to the second sub-region of the special third image is activated.

In one embodiment, to determine the second sub-region of the special third image that is most dissimilar to the corresponding sub-region of the second image, the sub-regions in the special third image corresponding respectively to the component lights of the traffic light are compared, respectively, against corresponding sub-regions in the second image.

Figure 1:
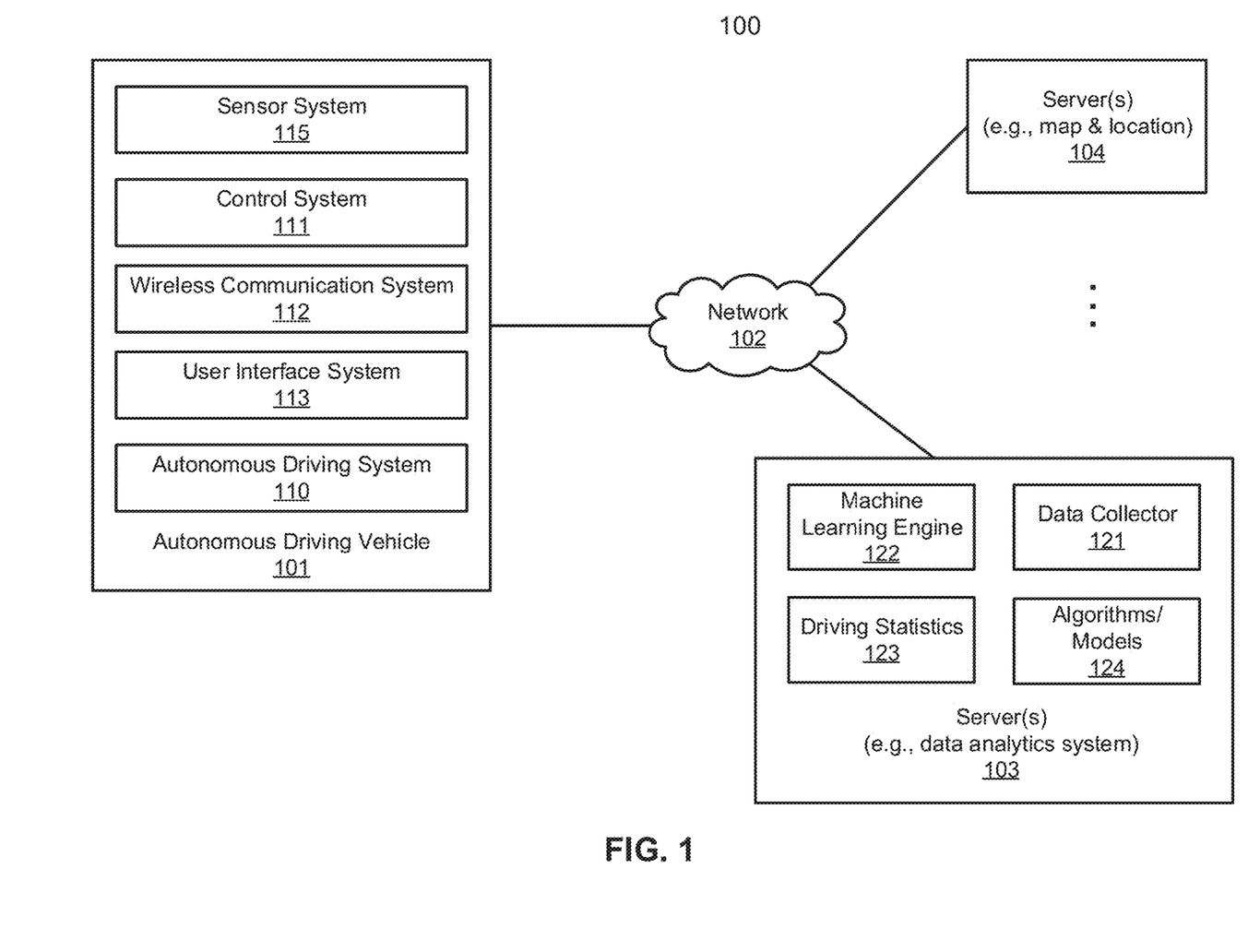
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
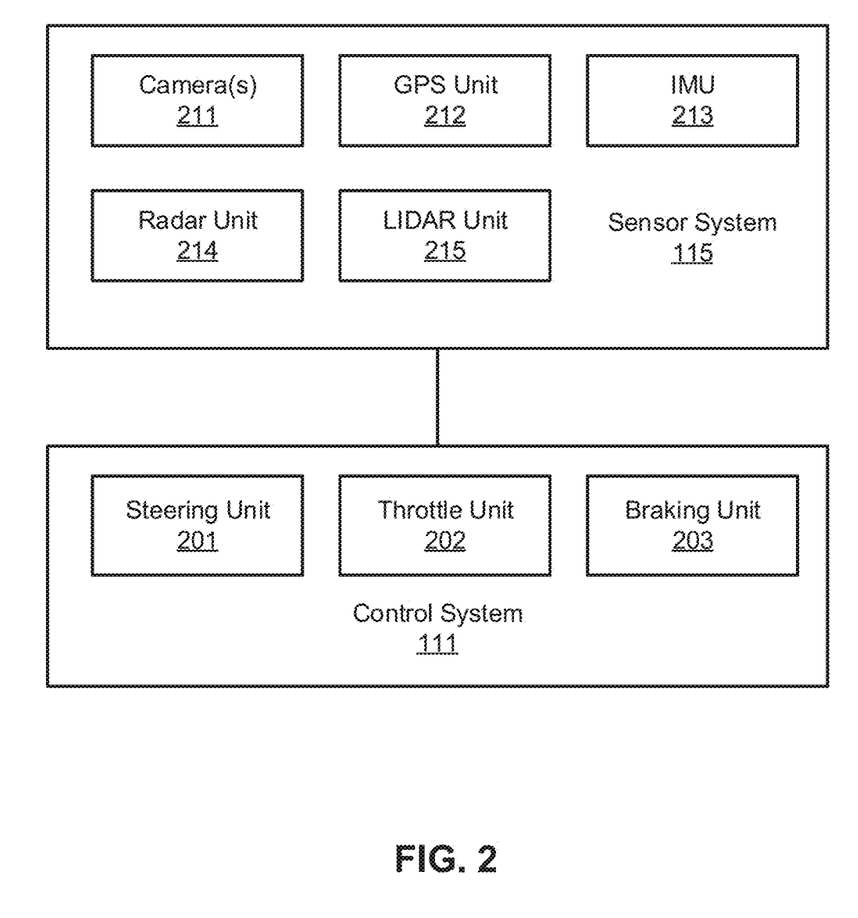
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm for automatically identifying a state of a traffic light in an image captured by the ADV, for example, by matching the image with a set of previously captured images associated with the traffic light, as described below. Algorithms 124 can then be uploaded on ADVs to be utilized during autonomous driving in real-time.

Figure 3A:
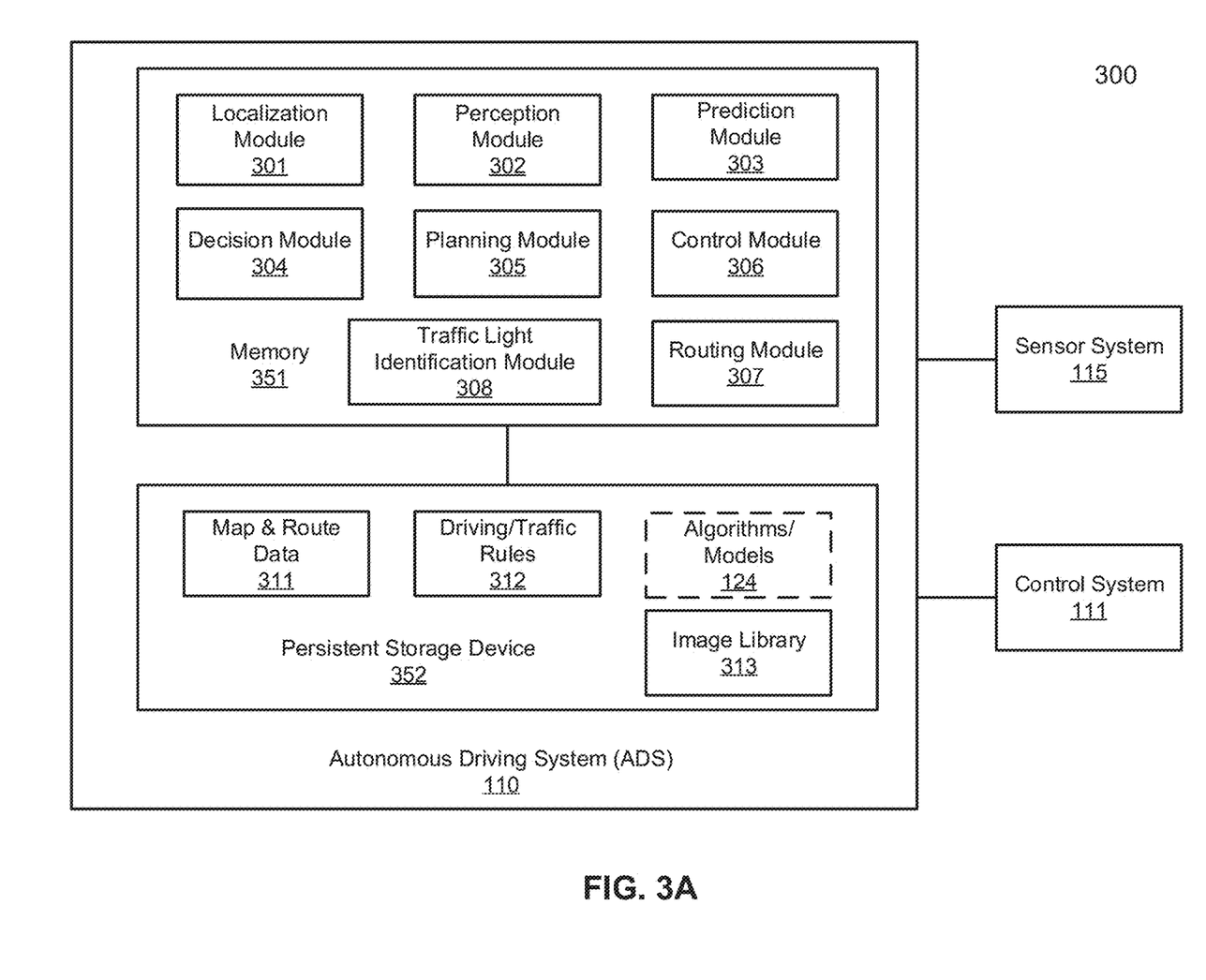
FIGS. 3A-3B are block diagrams illustrating an example of an autonomous driving system used with an autonomous driving vehicle according to one embodiment.
Figure 3B:
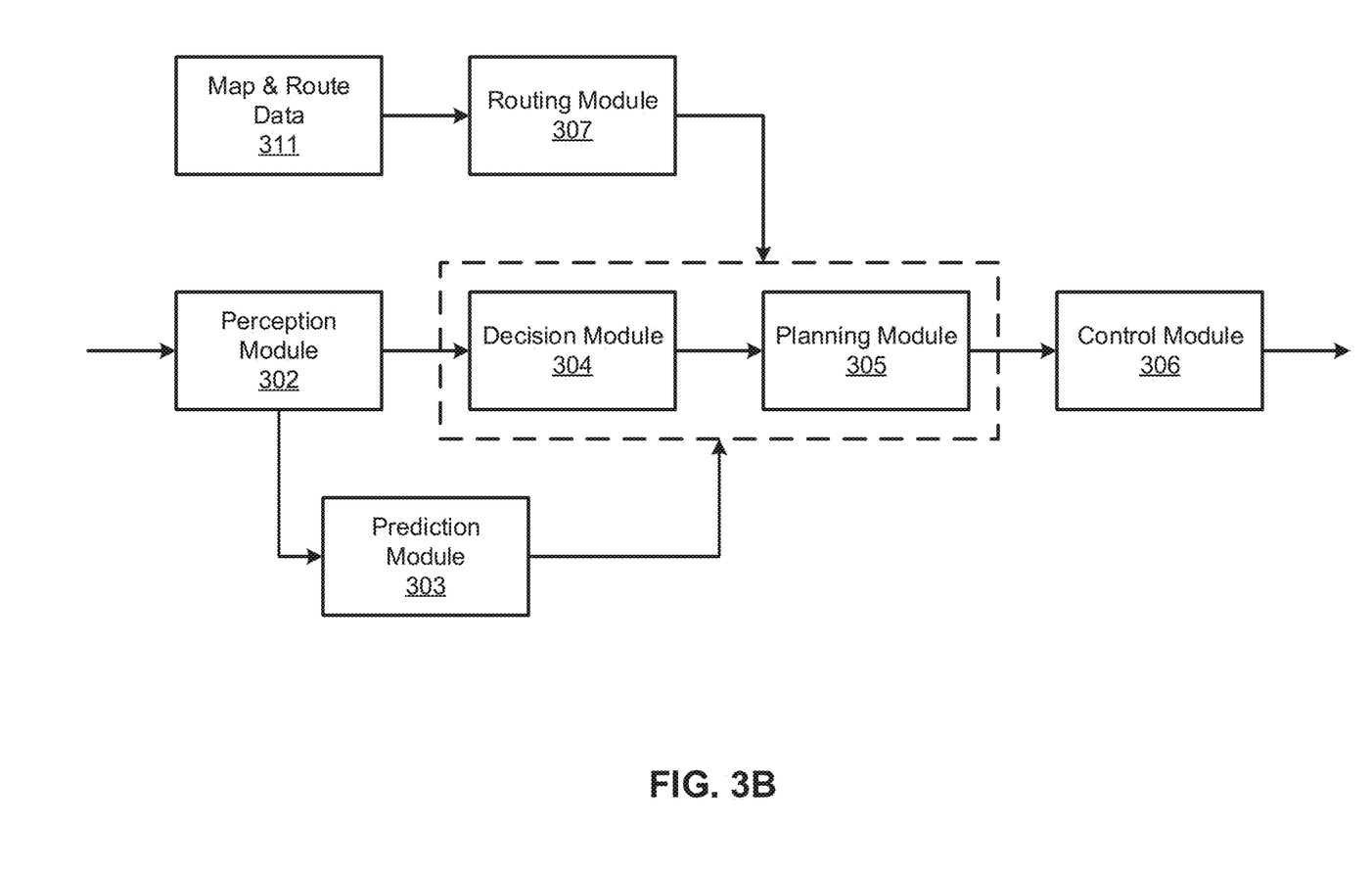

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and traffic light identification module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, module 308 may be integrated as a part of perception module 302.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
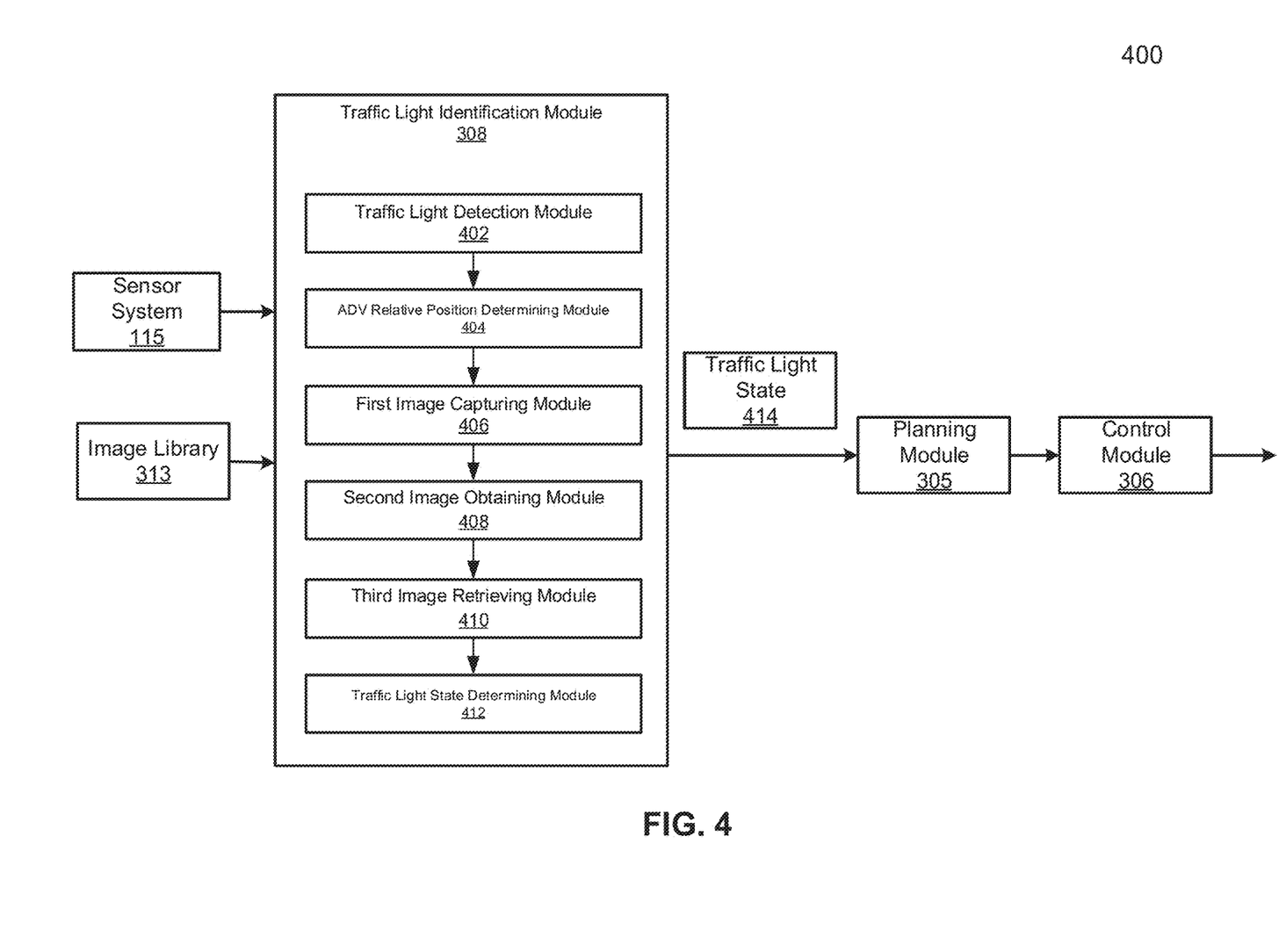
FIG. 4 is a block diagram illustrating various modules utilized in automatic identification of a state of a traffic light according to one embodiment.

Referring to FIG. 4, a block diagram 400 illustrating various modules utilized in automatic identification of a state of a traffic light according to one embodiment is shown. A state of an upcoming traffic light is determined at the traffic light identification module 308 based on images in a precompiled image library 313, which may be stored at the persistent storage device 352 in FIG. 3A. At an autonomous driving vehicle (ADV) 101, at a traffic light detection module 402, an upcoming traffic light ahead in a direction of travel is detected.

The detection of the traffic light may be based on inputs received from the sensor system 115 (e.g., inputs from one or more of: camera 211 or LIDAR unit 215, etc.) At an ADV relative position determining module 404, a relative position of the ADV to the traffic light is determined based on a three-dimensional (3D) position of the traffic light and a position of the ADV. It should be appreciated that hereinafter a relative position may refer to a combination of a direction and a distance. In particular, the 3D position of the traffic light may be determined based on a prepopulated map (e.g., map & route data 311). It should further be appreciated that the position of the ADV may be determined based on inputs received from the sensor system 115.

At first image capturing module 406, a first image whose content includes the traffic light is captured (e.g., by camera 211). At a second image obtaining module 408, a second image of the traffic light is obtained, which includes cropping the first image and preserving only a first sub-region of the first image that corresponds to the traffic light. The first sub-region of the first image that corresponds to the traffic light is determined based on the relative position of the ADV to the traffic light with known techniques. It should be appreciated that with some existing methods, specialized algorithms may be utilized to analyze the second image of the traffic light to determine the state of the traffic light.

Embodiments described herein do not rely on such specialized algorithms; instead, algorithms for determining similarity between images and the precompiled image library 313 comprising third images are utilized to determine the state of the traffic light, as described hereinafter. At a third image retrieving module 410, one or more third images of the traffic light are retrieved from a precompiled image library 313 based on the relative position of the ADV to the traffic light. At a traffic light state determining module 412, a state of the traffic light 414 is determined based on the one or more third images. At the planning module 305, a trajectory for the ADV 101 is planned based at least in part on the determined state of the traffic light 414. At the control module 306, control signals are generated to drive the ADV 101 based on the planned trajectory.

A traffic light may include a plurality of component lights of different colors (e.g., a green component light, a yellow component light, and a red component light; some traffic lights may not include a yellow component light) In one embodiment, the state of the traffic light includes one of: a green state (i.e., a green component light of the traffic light is on), a yellow state (i.e., a yellow component light of the traffic light is on), or a red state (i.e., a red component light of the traffic light is on). In another embodiment, the state of the traffic light may include only one of: the green state, or the red state.

In some embodiment, the third images stored in the image library 313 include images of the traffic light in all state and relative position permutations. In one embodiment, retrieving, at the ADV 101, the one or more third images of the traffic light include retrieving, at the ADV 101, a set of third images of the traffic light having been captured from a same relative position to the traffic light, each third image in the set of third images showing the traffic light in a respective state. To determine the state of the traffic light based on the one or more third images, one third image in the set of third images that is most similar to the second image is determined, and the state of the traffic light is determined based on the one third image in the set of third images that is most similar to the second image. Known methods for determining similarity between images may be utilized. In particular, the state of the traffic light shown in the one third image in the set of third images that is most similar to the second image is determined as the state of the traffic light.

In one embodiment, the precompiled image library 313 includes a plurality of sets of third images of the traffic light captured from a plurality of different relative positions to the traffic light, each set of third images corresponding to one respective relative position to the traffic light, and the set of third images retrieved at the ADV are the set whose corresponding relative position to the traffic light is closest to the relative position of the ADV to the traffic light. In other words, compiling the image library 313 may include capturing images of the traffic light when the traffic light is in all its different states from a plurality of different relative positions to the traffic light (e.g., 10, 20, . . . , 200 meters away, from different lanes or view angles) with a camera that is the same or similar to the camera 211 of the ADV 101, and cropping out portions of the captured images that do not correspond to the traffic light (e.g., different traffic light colors, day and/or night).

In one embodiment, the precompiled image library includes one or more sets of third images of the traffic light captured from different relative positions to the traffic light and in a plurality of different lighting conditions, each set of third images corresponding to one respective relative position to the traffic light and to one respective lighting condition, and the set of third images retrieved at the ADV are the set whose corresponding relative position to the traffic light is closest to the relative position of the ADV to the traffic light and whose corresponding lighting condition matches a present lighting condition.

In one embodiment, the different lighting conditions include a daylight lighting condition or a nighttime lighting condition. In other words, compiling the image library 313 may include capturing images of the traffic light when the traffic light is in all its different states (e.g., different colors) from different relative positions to the traffic light with a camera that is the same or similar to the camera 211 of the ADV 101 under different lighting conditions (e.g., day or night), and cropping out portions of the captured images that do not correspond to the traffic light.

In one embodiment, to determine one third image in the set of third images that is most similar to the second image, a similarity score is calculated against the second image for each third image in the set of third images. In some different embodiments, the third images stored in the image library 313 include special images of the traffic light that show the traffic light in a completely off state captured from a plurality of different relative positions to the traffic light.

In one embodiment, retrieving, at the ADV, the one or more third images of the traffic light include retrieving, at the ADV, a special third image of the traffic light having been captured from a particular relative position to the traffic light and showing the traffic light in a special state in which all component lights of the traffic light are off. To determine the state of the traffic light based on the one or more third images, among sub-regions in the special third image corresponding respectively to the component lights of the traffic light, a second sub-region of the special third image that is most dissimilar to a corresponding sub-region of the second image is determined, and the state of the traffic light is determined based on the second sub-region of the special third image.

In particular, the traffic light is determined to be in a state in which the component light corresponding to the second sub-region of the special third image is activated (for example, if the second sub-region corresponds to the green component light, the traffic light is determined to be in the green state). It should be appreciated that the special third images may be generated by capturing images of the traffic light while the traffic light is completely off and cropping out sub-regions of the images that do not correspond to the traffic light. In other embodiments, generating the special images may include editing images of the traffic light captured while the traffic light is in a normal (e.g., green, yellow, or red) state, which may further include stitching together, as appropriate, different portions of the images of the traffic light in its different states.

In one embodiment, to determine the second sub-region of the special third image that is most dissimilar to the corresponding sub-region of the second image, the sub-regions in the special third image corresponding respectively to the component lights of the traffic light are compared, respectively, against corresponding sub-regions in the second image. Known techniques for determining similarity between sub-regions of images may be utilized.

Figure 5:
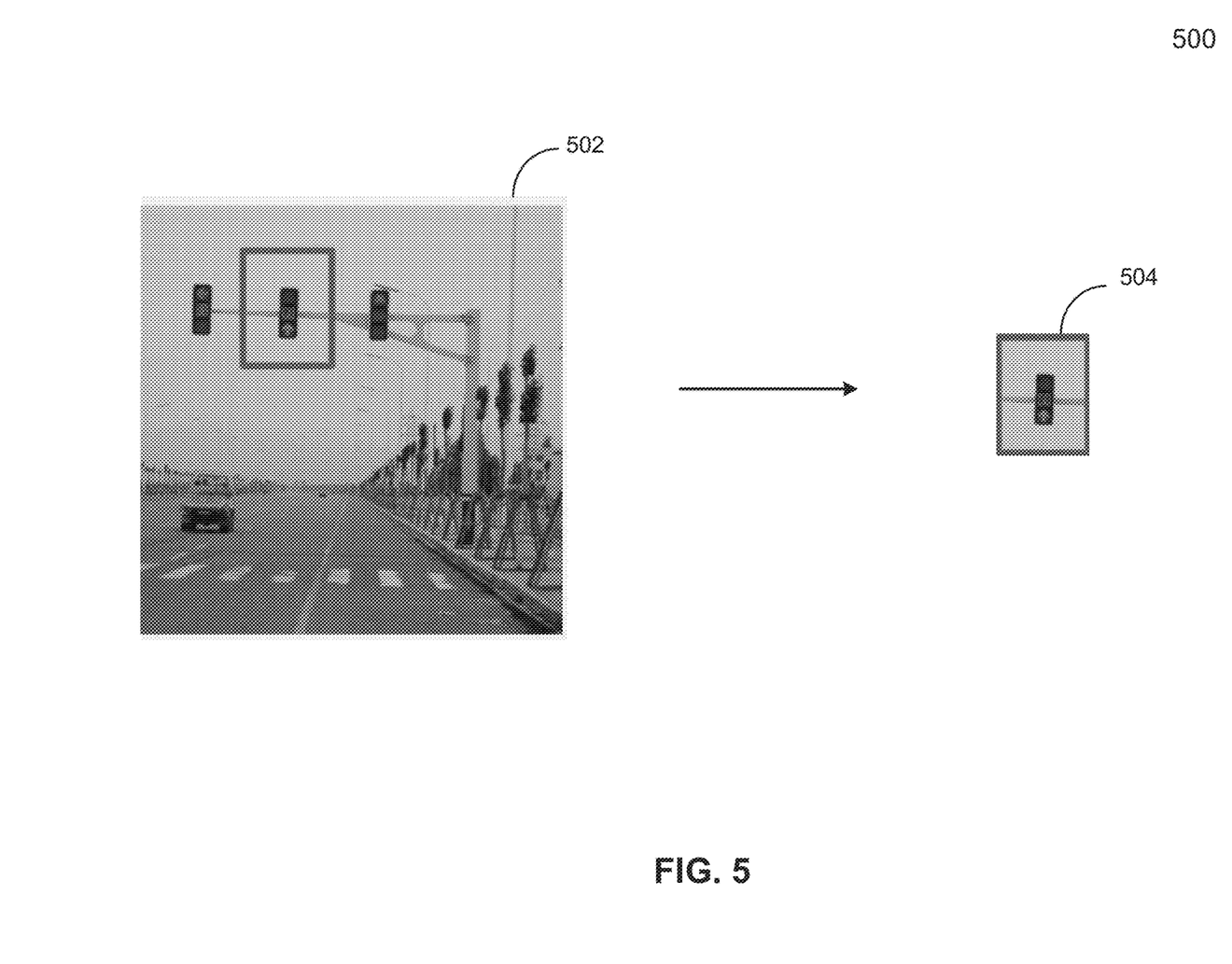
FIG. 5 is a diagram illustrating the generation of a second image according to one embodiment.

Referring to FIG. 5, a diagram 500 illustrating the generation of a second image according to one embodiment is shown. A first image 502, whose content includes a traffic light, is cropped, and only a sub-region corresponding to the traffic light is preserved, which is stored as a second image 504. It should be appreciated that the content of a second image may include the traffic light and its immediate vicinity. It should be further appreciated that a first image may show more than one traffic lights (e.g., for different lanes), as is the case with the first image 502 shown here, and the same technique may be utilized to obtain multiple second images from such a first image, where each second image corresponds to one of the traffic lights. Techniques described herein according to the various embodiments may be applied to each of the second images to determine the state of each of the traffic lights. It should also be appreciated that the same technique (i.e., capturing an image of the traffic light and cropping out irrelevant portions) may be utilized in the generation of third images during the compilation of the image library 313. As a result, a traffic light state can be quickly determined by matching the real-time captured image of the traffic light against a set of previously captured images of the same traffic light at the same or similar relative position, without having to perform a complicated (and time consuming) algorithm to analyze the image in order to determine the traffic light state or color.

Figure 6:
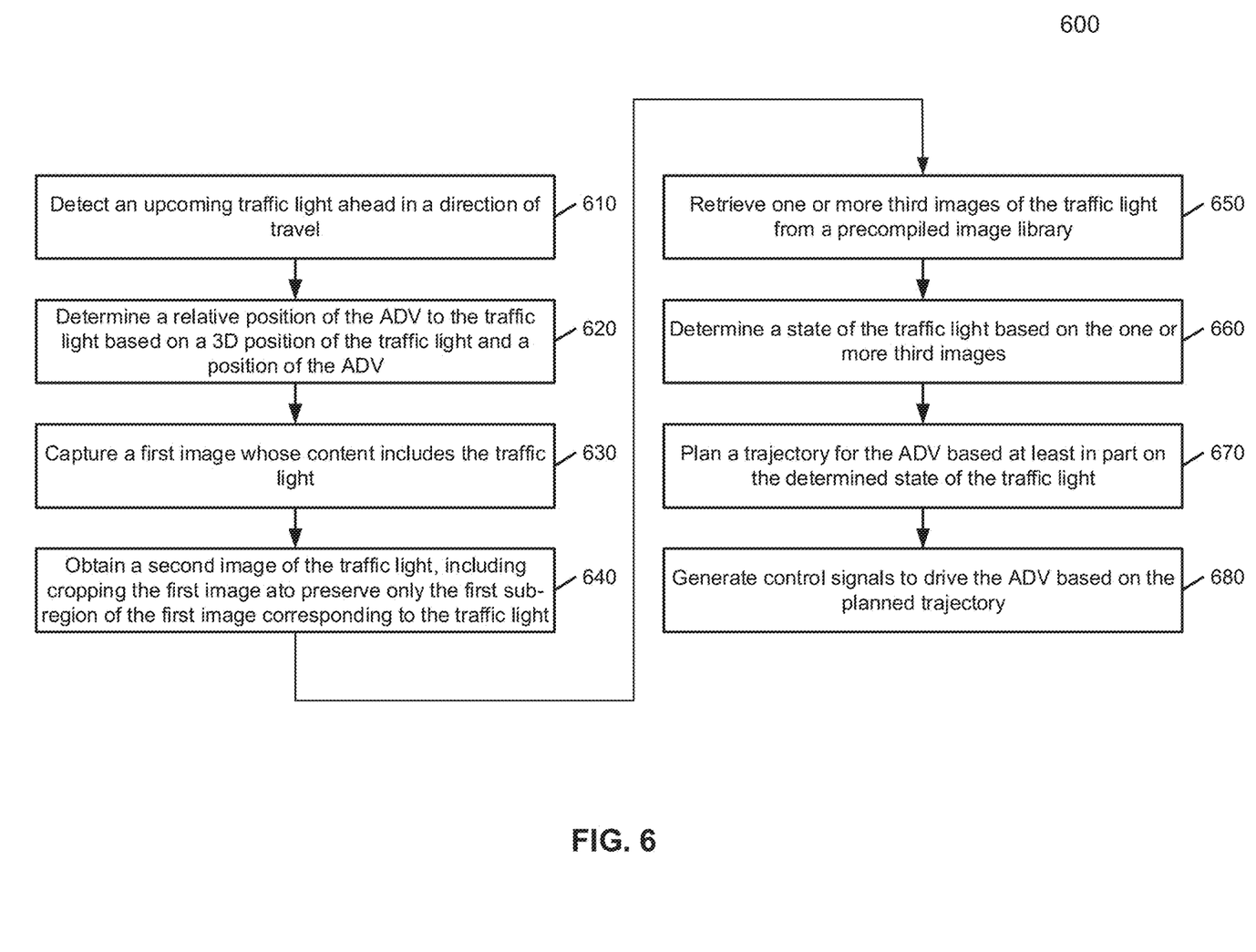
FIG. 6 is a flowchart illustrating an example method for automatically identifying a state of a traffic light according to one embodiment.

Referring to FIG. 6, a flowchart illustrating an example method 600 for automatically identifying a state of a traffic light according to one embodiment is shown. The process 600 may be implemented in software, hardware, or a combination thereof. At an autonomous driving vehicle (ADV) 101, at block 610, an upcoming traffic light ahead in a direction of travel is detected. The detection of the traffic light may be based on inputs received from the sensor system 115 (e.g., inputs from one or more of: camera 211 or LIDAR unit 215, etc.) At block 620, a relative position of the ADV to the traffic light is determined based on a three-dimensional (3D) position of the traffic light and a position of the ADV. It should be appreciated that hereinafter a relative position may refer to a combination of a direction and a distance. In particular, the 3D position of the traffic light may be determined based on a prepopulated map (e.g., map & route data 311). It should further be appreciated that the position of the ADV may be determined based on inputs received from the sensor system 115. At block 630, a first image whose content includes the traffic light is captured (e.g., by camera 211).

At block 640, a second image of the traffic light is obtained, which includes cropping the first image and preserving only a first sub-region of the first image that corresponds to the traffic light. The first sub-region of the first image that corresponds to the traffic light is determined based on the relative position of the ADV to the traffic light with known techniques. At block 650, one or more third images of the traffic light are retrieved from a precompiled image library 313 based on the relative position of the ADV to the traffic light. At block 660, a state of the traffic light is determined based on the one or more third images. At block 670, a trajectory for the ADV 101 is planned based at least in part on the determined state of the traffic light. At block 680, control signals are generated to drive the ADV 101 based on the planned trajectory.

Figure 7:
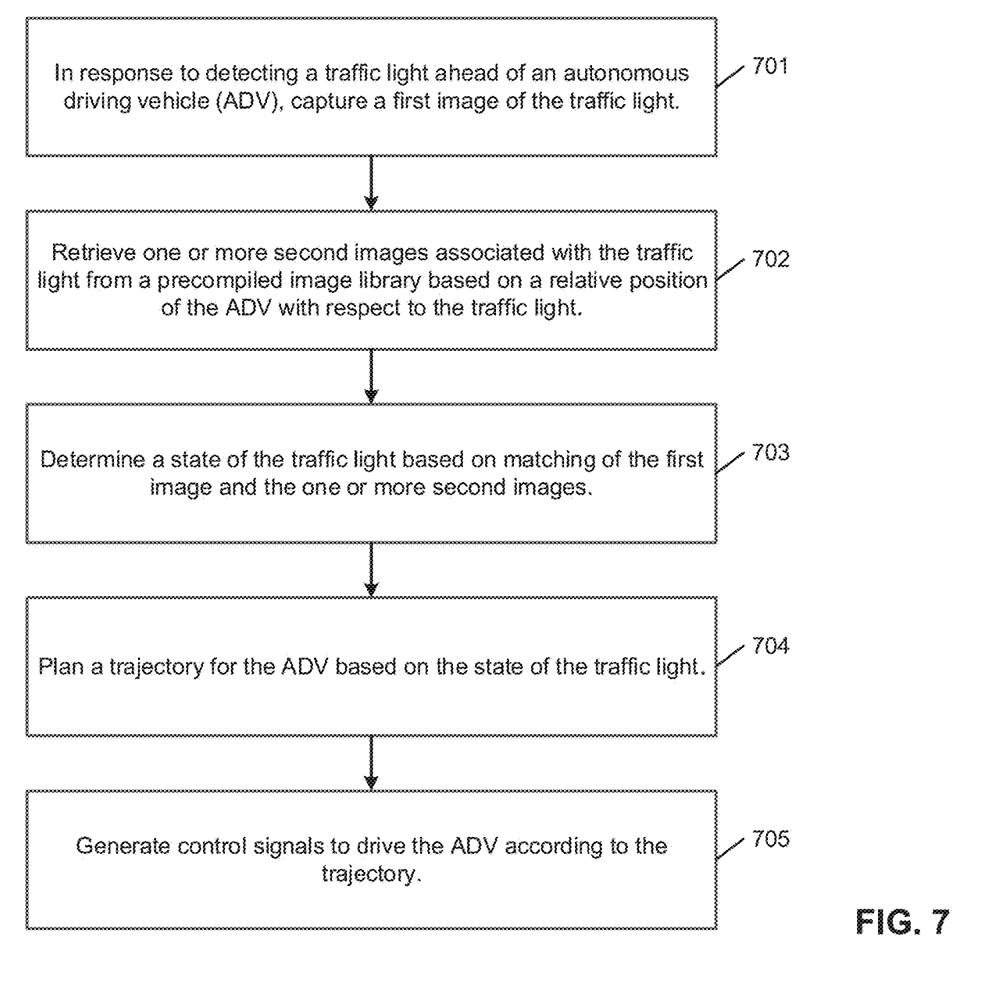
FIG. 7 is a flowchart illustrating an example method for automatically identifying a state of a traffic light according to another embodiment.

FIG. 7 is a flow diagram illustrating a process of determining a state of a traffic light according to another embodiment. Referring to FIG. 7, at block 701, in response to detecting a traffic light in front of an ADV, a first image of the traffic light is captured, for example, using a camera mounted on the ADV. At block 702, one or more second images are retrieved from a precompiled image library based on a relative position of the ADV with respect to the traffic light (e.g., distance, lane). At block 703, a state (e.g., color) of the traffic light is determined by matching the first image against the second images, without having to performing a complicated algorithm on the first image in order to determine the traffic light state. At block 704, a trajectory is planned for the ADV based on the state of the traffic light, and at block 705, control signals are generated to drive the ADV according to the trajectory.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    in response to detecting, at an autonomous driving vehicle (ADV), an upcoming traffic light ahead in a direction of travel, capturing a first image of the traffic light;
    retrieving, at the ADV, one or more second images associated with the traffic light from a precompiled image library based on a relative position of the ADV to the traffic light, wherein the relative position of the ADV to the traffic light is determined based on a position of the traffic light and a position of the ADV;
    determining, at the ADV, a state of the traffic light based on matching of the first image and the one or more second images, wherein determining the state of the traffic light based on matching of the first image and the one or more second images comprises:
        selecting an image from a set of second images that is most similar to the first image, wherein the set of second images were captured from a same relative position to the traffic light, and
        determining the state of the traffic light based on the selected image in the set of second images that is most similar to the first image;
    planning a trajectory for the ADV based at least in part on the determined state of the traffic light; and
    generating control signals to drive the ADV based on the planned trajectory.

2. The method of claim 1, wherein the state of the traffic light comprises one of:
    a green state, a yellow state, or a red state.

3. The method of claim 1, wherein the precompiled image library comprises a plurality of sets of second images of the traffic light captured from a plurality of different relative positions to the traffic light, each set of second images corresponding to one respective relative position to the traffic light, and wherein the set of second images retrieved at the ADV are the set whose corresponding relative position to the traffic light is closest to the relative position of the ADV to the traffic light.

4. The method of claim 1, wherein the precompiled image library comprises a plurality of sets of second images of the traffic light captured from a plurality of different relative positions to the traffic light and in a plurality of different lighting conditions, each set of second images corresponding to a respective relative position to the traffic light and to a respective lighting condition, and wherein the set of second images retrieved at the ADV are the set whose corresponding relative position to the traffic light is closest to the relative position of the ADV to the traffic light and whose corresponding lighting condition matches a present lighting condition.

5. The method of claim 4, wherein the plurality of different lighting conditions comprises a daylight lighting condition or a nighttime lighting condition.

6. The method of claim 1, wherein determining one third image in the set of second images that is most similar to the first image comprises calculating a similarity score against the first image for each second image in the set of second images.

7. The method of claim 1, wherein retrieving, at the ADV, the one or more second images of the traffic light comprises retrieving, at the ADV, a special second image of the traffic light having been captured from a particular relative position to the traffic light and showing the traffic light in a special state in which all component lights of the traffic light are off, and wherein determining the state of the traffic light based on the one or more second images further comprises:
    determining, among sub-regions in the special second image corresponding respectively to the component lights of the traffic light, a first sub-region of the special second image that is most dissimilar to a corresponding sub-region of the first image; and
    determining the state of the traffic light based on the first sub-region of the special second image, wherein the traffic light is determined to be in a state in which the component light corresponding to the first sub-region of the special second image is activated.

8. The method of claim 7, wherein determining the first sub-region of the special second image that is most dissimilar to the corresponding sub-region of the first image comprises comparing, respectively, the sub-regions in the special second image corresponding respectively to the component lights of the traffic light against corresponding sub-regions in the first image.

9. A non-transitory machine-readable medium having instructions stored therein, which when executed by a processor, cause the processor to perform operations, the operations comprising:
    in response to detecting, at an autonomous driving vehicle (ADV), an upcoming traffic light ahead in a direction of travel, capturing a first image of the traffic light;
    retrieving, at the ADV, one or more second images associated with the traffic light from a precompiled image library based on a relative position of the ADV to the traffic light, wherein the relative position of the ADV to the traffic light is determined based on a position of the traffic light and a position of the ADV;
    determining, at the ADV, a state of the traffic light based on matching of the first image and the one or more second images, wherein determining the state of the traffic light based on matching of the first image and the one or more second images comprises:
        selecting an image from a set of second images that is most similar to the first image, wherein the set of second images were captured from a same relative position to the traffic light, and
        determining the state of the traffic light based on the selected image in the set of second images that is most similar to the first image;
    planning a trajectory for the ADV based at least in part on the determined state of the traffic light; and
    generating control signals to drive the ADV based on the planned trajectory.

10. The machine-readable medium of claim 9, wherein the state of the traffic light comprises one of: a green state, a yellow state, or a red state.

11. The machine-readable medium of claim 9, wherein the precompiled image library comprises a plurality of sets of second images of the traffic light captured from a plurality of different relative positions to the traffic light, each set of second images corresponding to one respective relative position to the traffic light, and wherein the set of second images retrieved at the ADV are the set whose corresponding relative position to the traffic light is closest to the relative position of the ADV to the traffic light.

12. The machine-readable medium of claim 9, wherein the precompiled image library comprises a plurality of sets of second images of the traffic light captured from a plurality of different relative positions to the traffic light and in a plurality of different lighting conditions, each set of second images corresponding to a respective relative position to the traffic light and to a respective lighting condition, and wherein the set of second images retrieved at the ADV are the set whose corresponding relative position to the traffic light is closest to the relative position of the ADV to the traffic light and whose corresponding lighting condition matches a present lighting condition.

13. The machine-readable medium of claim 12, wherein the plurality of different lighting conditions comprises a daylight lighting condition or a nighttime lighting condition.

14. The machine-readable medium of claim 9, wherein determining one third image in the set of second images that is most similar to the first image comprises calculating a similarity score against the first image for each second image in the set of second images.

15. The machine-readable medium of claim 9, wherein retrieving, at the ADV, the one or more second images of the traffic light comprises retrieving, at the ADV, a special second image of the traffic light having been captured from a particular relative position to the traffic light and showing the traffic light in a special state in which all component lights of the traffic light are off, and wherein determining the state of the traffic light based on the one or more second images further comprises:
  determining, among sub-regions in the special second image corresponding respectively to the component lights of the traffic light, a first sub-region of the special second image that is most dissimilar to a corresponding sub-region of the first image; and
  determining the state of the traffic light based on the first sub-region of the special second image, wherein the traffic light is determined to be in a state in which the component light corresponding to the first sub-region of the special second image is activated.

16. The machine-readable medium of claim 15, wherein determining the first sub-region of the special second image that is most dissimilar to the corresponding sub-region of the first image comprises comparing, respectively, the sub-regions in the special second image corresponding respectively to the component lights of the traffic light against corresponding sub-regions in the first image.

17. A data processing system, comprising:
a processor; and
a memory coupled to the processor to store instructions, which when executed by the processor, cause the processor to perform operations, the operations including
  in response to detecting, at an autonomous driving vehicle (ADV), an upcoming traffic light ahead in a direction of travel, capturing a first image of the traffic light;
  retrieving, at the ADV, one or more second images associated with the traffic light from a precompiled image library based on a relative position of the ADV to the traffic light, wherein the relative position of the ADV to the traffic light is determined based on a position of the traffic light and a position of the ADV;
  determining, at the ADV, a state of the traffic light based on matching of the first image and the one or more second images, wherein determining the state of the traffic light based on matching of the first image and the one or more second images comprises:
    selecting an image from a set of second images that is most similar to the first image, wherein the set of second images were captured from a same relative position to the traffic light, and
    determining the state of the traffic light based on the selected image in the set of second images that is most similar to the first image;
  planning a trajectory for the ADV based at least in part on the determined state of the traffic light; and
  generating control signals to drive the ADV based on the planned trajectory.

18. The system of claim 17, wherein the state of the traffic light comprises one of:
a green state, a yellow state, or a red state.

19. The system of claim 17, wherein the precompiled image library comprises a plurality of sets of second images of the traffic light captured from a plurality of different relative positions to the traffic light, each set of second images corresponding to one respective relative position to the traffic light, and wherein the set of second images retrieved at the ADV are the set whose corresponding relative position to the traffic light is closest to the relative position of the ADV to the traffic light.

20. The system of claim 17, wherein the precompiled image library comprises a plurality of sets of second images of the traffic light captured from a plurality of different relative positions to the traffic light and in a plurality of different lighting conditions, each set of second images corresponding to a respective relative position to the traffic light and to a respective lighting condition, and wherein the set of second images retrieved at the ADV are the set whose corresponding relative position to the traffic light is closest to the relative position of the ADV to the traffic light and whose corresponding lighting condition matches a present lighting condition.

* * * * *